United States Patent [19]

Sauer

[11] 4,130,387
[45] Dec. 19, 1978

[54] APPARATUS FOR THERMOFORMING PLASTIC ARTICLES

[75] Inventor: Donald G. Sauer, Harwinton, Conn.

[73] Assignee: National Can Corporation, Chicago, Ill.

[21] Appl. No.: 717,636

[22] Filed: Aug. 25, 1976

Related U.S. Application Data

[63] Continuation-in-part of Ser. No. 448,191, Mar. 5, 1974, abandoned, and Ser. No. 469,404, May 13, 1974, and Ser. No. 583,427, Jun. 3, 1975, Pat. No. 4,085,177, and Ser. No. 506,333, Sep. 16, 1974, abandoned.

[51] Int. Cl.² .............................................. B29C 17/04
[52] U.S. Cl. .................................... 425/388; 425/398; 425/416
[58] Field of Search ........................ 425/416, 388, 398

[56] References Cited

U.S. PATENT DOCUMENTS

| | | | |
|---|---|---|---|
| 2,300,162 | 10/1942 | Maude | 425/398 X |
| 3,105,270 | 10/1963 | Fibish | 425/145 |
| 3,341,895 | 9/1967 | Shelby | 425/388 X |
| 3,346,923 | 10/1967 | Brown et al. | 425/162 |
| 3,376,607 | 4/1968 | Brown | 425/416 X |
| 3,507,007 | 4/1970 | Martin | 425/388 |

Primary Examiner—Robert L. Spicer, Jr.
Attorney, Agent, or Firm—Marn & Jangarathis

[57] ABSTRACT

There is disclosed a novel apparatus for thermoforming a plastic article wherein the male mold assembly and the female mold assembly are disposed on support members which are maintained in fixed relationship to each other during thermoforming operation. The sheet of thermoforming material after initial heating is trapped by clamping devices associated with the assemblies with the male die and female die molds associated with the male and female mold assemblies, respectively, being operated by fluid cylinder assemblies motivated by pressurized fluid.

7 Claims, 7 Drawing Figures

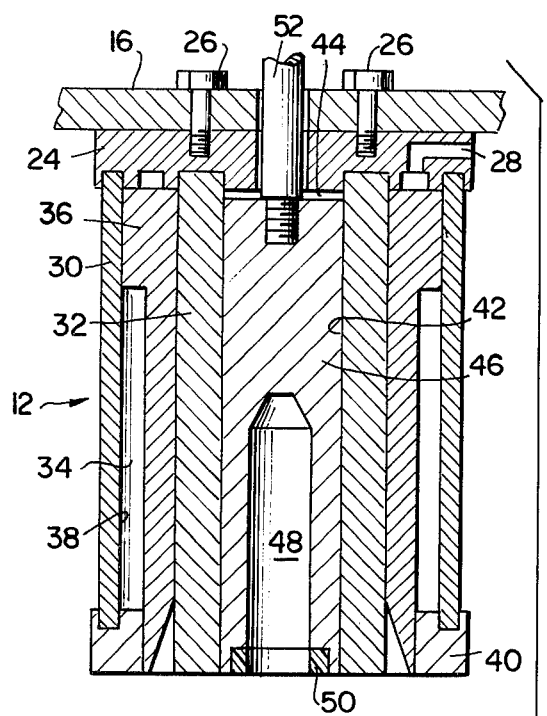
FIG.2
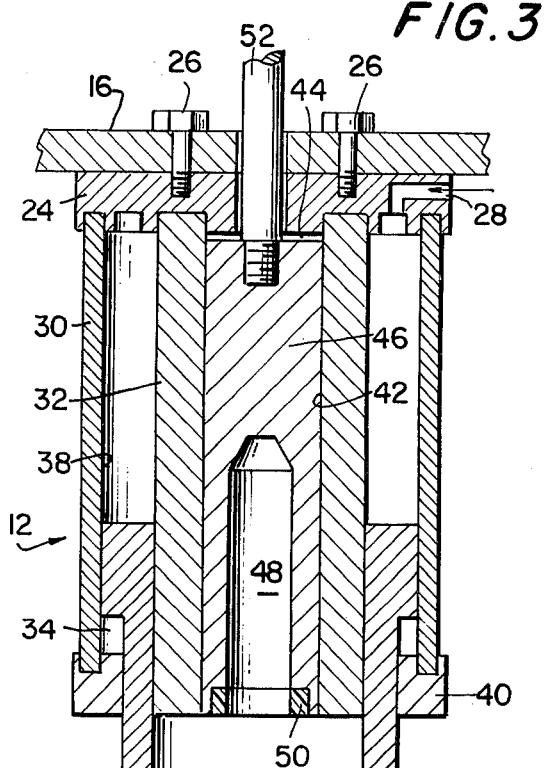
FIG.3
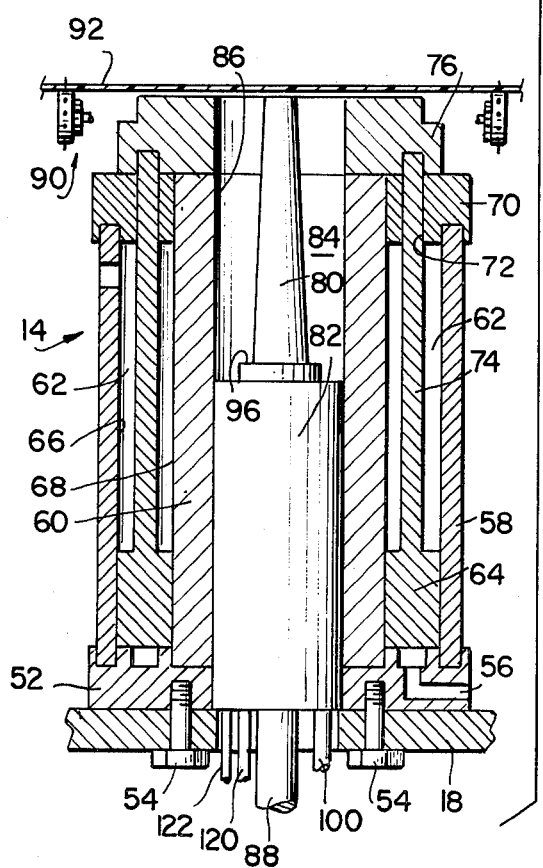
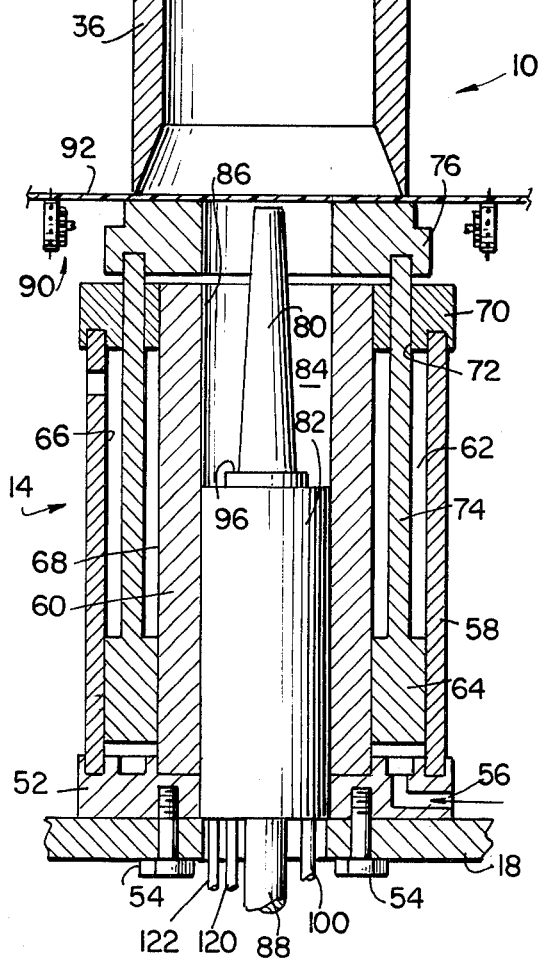

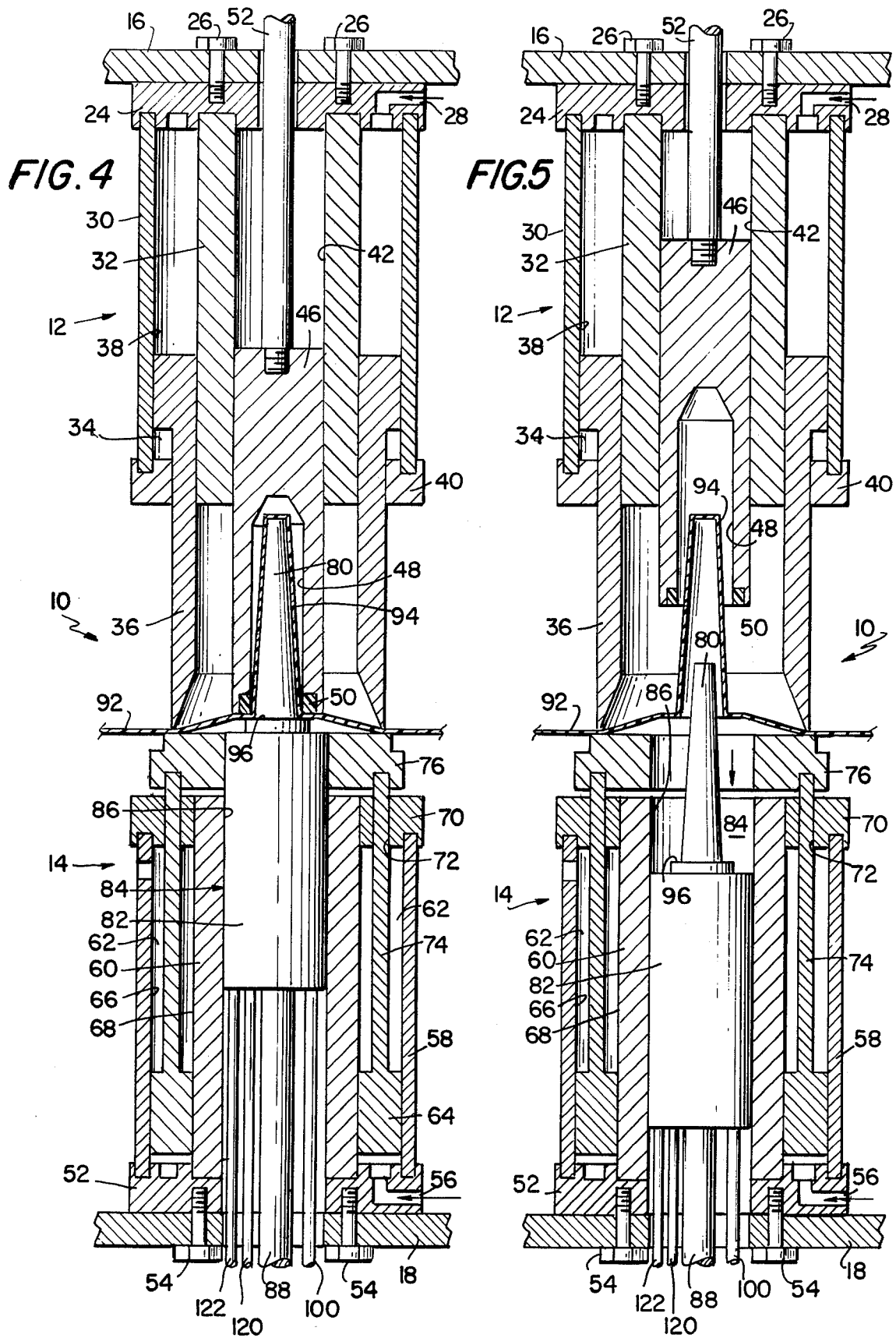

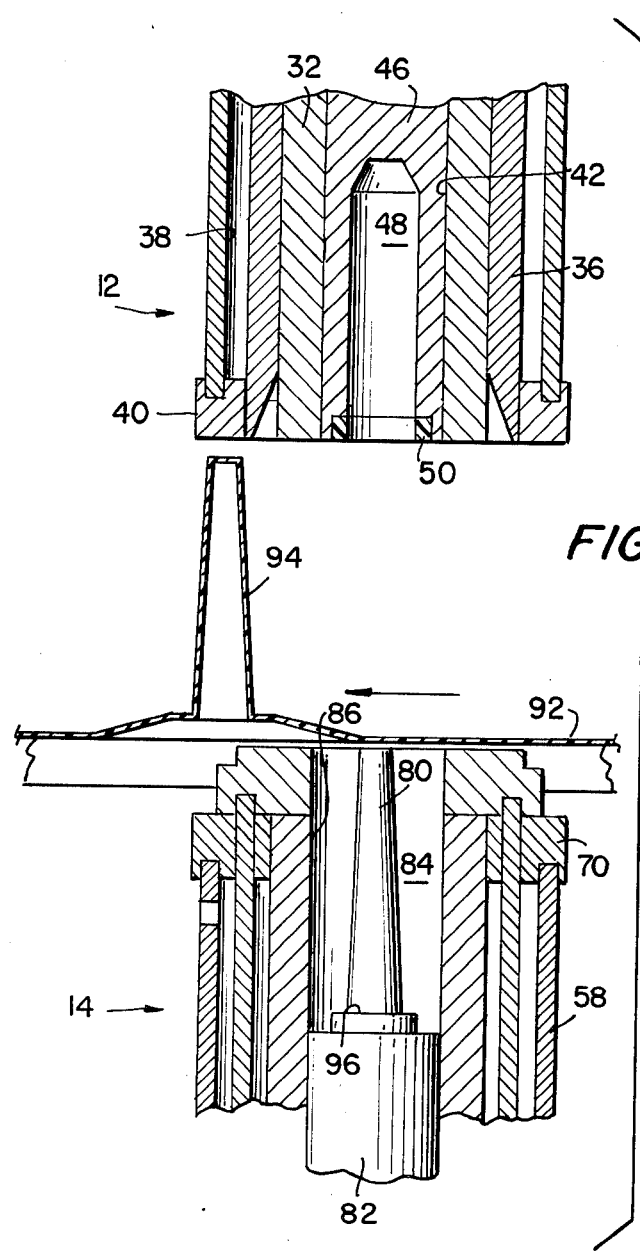
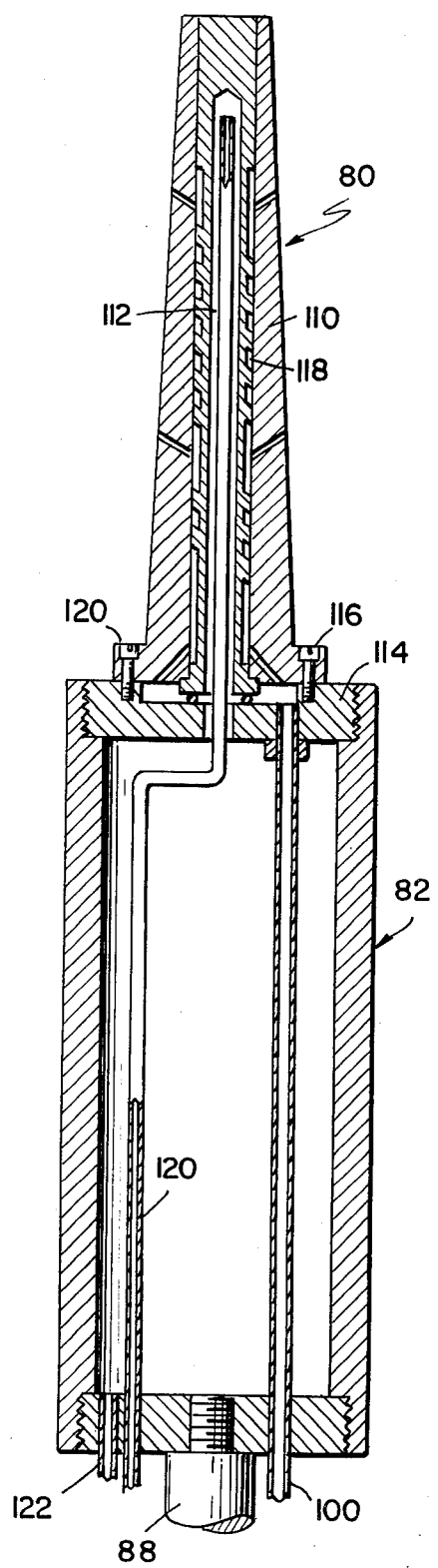
FIG. 6
FIG. 7

APPARATUS FOR THERMOFORMING PLASTIC ARTICLES

RELATED U.S. APPLICATION

This invention is a continuation-in-part of application Ser. Nos. 448,191, now abandoned; 469,404; 583,427 now U.S. Pat. No. 4,085,177 and 506,333 now abandoned, filed Mar. 5, 1974; May 13, 1974; June 3, 1975 and Sept. 16, 1974, respectively.

FIELD OF THE INVENTION

This invention relates to a novel apparatus for molding plastic articles from a sheet or strip of thermoplastic material.

BACKGROUND OF THE INVENTION

This invention is particularly concerned with thermoforming operations in which a web or sheet of thermoplastic material is first softened by heat and then formed or shaped while in this stretchable plastic state by being drawn or pressed against the contours of a mold or die under the influence of a fluid pressure differential. The former may be exemplified by the application of pressure within a pressure box or female mold assembly produced by compressed air or the like, to press the softened material against the contours of a male mold or core pin. Alternately, a vacuum may be applied from within a female mold while allowing atmospheric pressure to shape the heat softened thermoplastic material against the surface of the female mold. For many purposes, a combination of these two techniques is preferred with the softened sheet material being subjected to vacuum on the face contacting the mold surfaces and to a substantial positive pressure on its other face as such combination provides greater versatility and better control in the forming operation.

Apparatus for effecting thermoforming operations, in general, is comprised of a press having upper and lower platens on which are mounted a male mold assembly and female mold or pressure box assembly. In this regard, the male mold is generally mounted on the lower platen, however, this is normally a matter of choice. Prior to forming of the sheet of thermoplastic material as hereinabove discussed, a clamping assembly normally constituting a part of the male mold assembly is first caused to trap the sheet of thermoplastic material about the entrance into the female mold of the pressure box assembly including a cooperating clamping grid. Thereafter, the male mold of the male mold assembly is caused to pass through the plane of the thermoplastic material and eventually form the hollow article, as hereinabove discussed. Relative movement of the male and female mold assemblies is effected by hydraulic cylinder or electric motors assemblies together with associated cams, gears, support arms, etc., to move the platens whereas movement of a clamping assembly is effected by an associated cylinder assembly.

The hydraulic cylinder or electric motor assemblies are large even for small thermoforming apparatus and have large energy requirements. In this application the term fluid cylinder assembly is to be interpreted as the combination of a cylinder, piston and rod which is operated by a pressurized fluid i.e. a gas or a liquid.

OBJECTS OF THE INVENTION

It is an object of the present invention to provide a novel apparatus for thermoforming plastic articles.

Still another object of the present invention is to provide a novel apparatus for thermoforming plastic articles requiring reduced energy requirements.

Various other objects and advantages of the present invention will become apparent from the following detailed description of an exemplary embodiment thereof with the novel features thereof being particularly pointed out in the appended claims.

SUMMARY OF THE INVENTION

These and other objects of the present invention are achieved by a novel apparatus for thermoforming a plastic article wherein the male mold assembly and the female mold assembly are disposed on support members which are maintained in fixed relationship to each other during thermoforming operation. The sheet of thermoforming material after initial heating is trapped by clamping devices associated with the assemblies with the male die and female die molds associated with the male and female mold assemblies, respectively, being operated by fluid cylinder assemblies motivated by pressurized fluid, as more fully hereinafter described.

BRIEF DESCRIPTION OF THE DRAWINGS

The invention will be more clearly understood by reference to the following detailed description of an exemplary embodiment thereof in conjunction with the accompanying drawings with like reference numerals designated like parts in all Figures in which:

FIGS. 2 to 6 are vertical side views, partially side sections of the thermoforming machine of FIG. 1 sequentially illustrating the formation of a hollow article; and FIG. 7 is a vertical sectional view of the male mold of a portion of the male mold assembly.

DETAILED DESCRIPTION OF THE INVENTION

Figure 1:
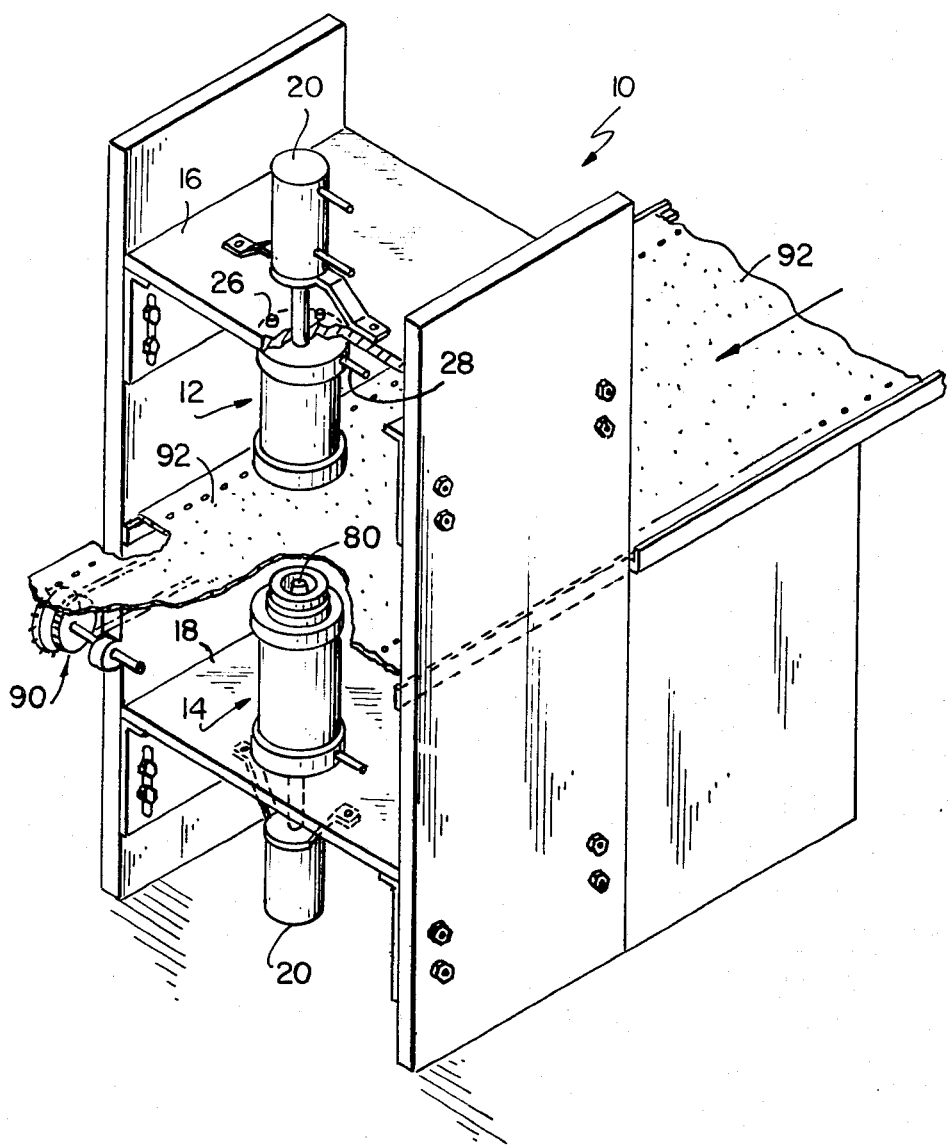
FIG. 1 is a schematic vertical view of a thermoforming molding machine embodying the principles of the present invention with some accessories omitted for greater clarity.

It will be appreciated that the type of thermoplastic or thermoelastically deformable material employed in the present process is generally determined by the economics and duty of the product article. Among the many thermoplastic resins suitable for various purposes and adaptable to thermoforming are high-impact polystyrene, polybutadiene, styrene-butadiene blends or copolymers, polyvinylchloride and related vinyl polymers, polyallomers, nylon, formaldehyde polymers, polyethylene, polypropylene, nitrocellulose, cellulose acetate, cellulose propionate, cellulose acetate, acetate butyrate, polymethylmethacrylate, ethyl cellulose, benzyl cellulose and ethyl-esters of cellulose.

Referring now to FIG. 1, there is illustrated a molding machine, generally indicated as 10, comprised of a pressure box or female mold assembly, generally indicated as 12, and a male mold assembly, generally indicated as 14 mounted on upper and lower platens 16 and 18, respectively. The platens 16 and 18 are adjustable in a vertical direction to permit proper positioning thereof with reference to the product being molded and the die components of the mold assembly, as more fully hereinafter understood. Each platen 16 and 18 are provided with a fluid cylinder assembly 20. In the preferred assembly, it is contemplated that such cylinders would be gaseously motivated. All such cylinder assemblies would be alternately placed in fluid communication with the compression and suction sides of a pump (not shown) in a manner known to one skilled in the art. It will be understood that any such thermoforming assembly would be associated with the usual control panels for providing adequate control of cycle time, temperature, etc., as well as condition monitoring. It will also be understood that a plurality of mold assemblies may be disposed on each platen together with an associated fluid cylinder assembly.

FIG. 2 depicts the initial stage of the actual forming cycle, and also illustrates in greater detail the general construction and arrangement of various parts of the equipment. In the interest of clarity, all items are to be assumed to be cylindrical or conically shaped, it being understood, however, that any shape may be used with due regard to the product being produced. The pressure box or female mold assembly 12 includes a base plate 24 rigidly mounted to the upper platen 16, such as by bolts 26, and is provided with a passageway 28 to permit the flow of a fluid medium therein. Vertically mounted to the base 24 is an outer cylindrically-shaped member 30 and an inner cylindrically-shaped member 32 forming a cylindrical compartment 34 for an upper cylindrically-shaped clamping device 36 by inner and outer walls 38 and 40 of the outer and inner members 30 and 32, respectively. A ring member 40 is mounted at the lower portion of the outer member 30 to provide for the fluid integrity of the compartment 34.

An inner wall 42 of the inner member 32 defines a chamber 44 in which is positioned a cylindrically-shaped female member 46 having a chamber 48 and including a swage and die ring 50, as more clearly hereinafter described. The female member 46 is threadably engaged by a rod 52 of the upper cylinder assembly 20. An orifice (not shown) may be provided into the chamber 48 of the female member to permit the introduction of a compressed fluid into the chamber 48 of the pressure box assembly 12 by placing such an orifice in fluid communication with the compression side of a pump (not shown), such as described and shown in copending application Ser. No. 583,427 filed June 8, 1975 and assigned to the same assignee as the present invention.

The male mold assembly 14 is comprised of a base plate 52 rigidly mounted to the lower platen 18, such as by bolts 54, and is provided with a passageway 56 to provide for the flow of a fluid therethrough. Vertically mounted to the base plate 52 is a cylindrically-shaped outer member 58 and a cylindrically-shaped inner member 60 forming a compartment 62 therebetween for cylindrically-shaped cage member 64 by inner and outer walls 66 and 68 of the outer and inner members 58 and 60 respectively. A ring member 70 is mounted to the upper portion of the outer member 58 to provide for the fluid integrity of compartment 62 with the inner member 60. The ring member 70 is formed with a plurality of orifices 72 to receive in reciprocating relationship rods 74 of the cage member 64 to which is mounted a clamping grid 76.

The male mold assembly 14 includes a conically-shaped male mold 80 mounted on a cylindrically-shaped member 82 and disposed in a compartment 84 formed by inner wall 86 of the inner member 60. The member 82 is threadably engaged with a rod 88 of the lower cylinder assembly 20. The male mold 80 may be formed in part of a porous material (i.e., having a multiplicity of discrete passageways formed during fabrication thereof), such as 2 micron stainless steel, such as disclosed in co-pending application Ser. No. 448,191, filed Feb. 4, 1974, and assigned to the same assignee as the present invention. The male mold 80 is generally formed of a material exhibiting excellent heat transfer properties, such as copper, and with a conduit system to provide fluid communication between the porous metal portions as more fully hereinafter described.

In FIG. 2 there is also illustrated a feed mechanism, generally indicated as 90, for advancing the thermoplastic web or sheet 92, after being heated to a softened state by suitable means (not shown), such as radiant heaters, infra red lamps, etc. The following description in conjunction with FIGS. 2 to 6 illustrates the sequence of steps in the formation of a hollow article in accordance with the present invention. As is known to those skilled in the art, the pressure box assembly 12, at the beginning of a cycle, is positioned above the thermoplastic sheet a distance sufficient to permit the subsequent unimpeded horizontal passage of the formed article upon advancement of the thermoplastic sheet, however, in accordance with the present invention, the pressure box assembly 12 is fixedly positioned relative to the sheet of thermoplastic material as is the male mold assembly 14.

The strip of thermoplastic sheet 92 softened to an optimum forming temperature (i.e., to a stretchable plastic condition) is advanced by the feed mechanism 90 into position between the upper and lower assemblies 12 and 14. The upper clamping device 36 is caused to be moved downwardly to a point proximate to the sheet 92 with the clamping grid 76 being raised to the position shown in FIG. 3, the introduction of a pressurized fluid into chambers 44 and 62 by conduits 28 and 56, respectively, whereby the clamping grid 76 is pressed against the lower surface of the sheet 92 thus trapping the sheet or web of thermoplastic material between the clamping device 36 and the clamping grid 76. Positive fluid pressure is continuously maintained within the chambers 44 and 62 to retain the grip on the plastic sheet 92 during the forming operation. Simultaneously or subsequent to the trapping of the thermoplastic sheet 92 between the upper and lower assemblies, the male mold 80 is caused to be moved upwardly by the action of the piston of the lower fluid cylinder assembly 20 whereby the male mold member 50 is caused to pass through the plane of the thermoplastic material 92. Upward movement of the male mold 80 is continued until the male mold assembly 80 is in a fully extended position with the female member 46 being caused to be moved vertically downwardly by the action of a piston of the upper fluid cylinder assembly 20, as illustrated in FIG. 3 thereby forming hollow article 94. The lower ring portion 96 of the male mold 80 may cooperate with the swage ring 50 to sever the formed article 94 from the sheet of thermoplastic material, and is generally a preferred method of operating the present invention when manufacturing preforms for a composite barrier container.

During upward movement of the male mold 80 through the plane of the thermoplastic material, the interior portion of the male mold may be placed under a negative pressure by causing such interior portion to be placed in fluid communication with the suction side of the pump (not shown) by conduit 100 during stretching of the thermoplastic sheet or film 92 to control wall thickness of the shaped article 94. A compressed fluid may be introduced into the chamber 48 of the female die 46 to assist in the conformation of the thermoplastic material 92 about the contoured surface of the male mold 80.

After formation of the article 94, the female member 46 and clamping device 36 are caused to be raised vertically upwards, with the male mold 80 and clamping grid 76 being caused to be lowered vertically downwardly to initial positions whereby the formed hollow article 94 may be readily removed or advanced during subsequent advancement of the thermoplastic sheet 92 by the drive means 90. The interior portion of the male mold member 80 may be placed on the compression side of a pump (not shown) to facilitate removal of the hollow article 94 from the contour surface of the male mold member 80.

The feed mechanism 90 is thereafter actuated to move a section of web 92 having the shaped article 102 projecting thereabove out of the machine 10, and to position a fresh section of heated plastic sheet between the assemblies 12 and 14 in preparation for the next molding cycle. Hollow articles formed in accordance with the present invention may be conveyed to a liner feeder apparatus, such as disclosed in co-pending application U.S. Ser. No. 492,783 filed July 29, 1974, assigned to the same assignee as the present application.

While the present invvention has been described with reference to the thermoforming of a hollow article about a male mold or die using a pressure box assembly, it will be appreciated that a hollow article may be formed against a female die using a plug assist. Additionally, the assembly may be operated in planes, other than a horizontal plane.

Referring to FIG. 7 illustrating in greater detail the male mold and associated parts similar to the male mold described in the hereinabove mentioned copending Application Ser. No. 506,333, filed Sept. 16, 1974 except for the greater length to diameter ratio for producing narrow composite containers, the male mold 80 is comprised of a conically-shaped outer member 110 disposed about an inner support member 112 with the male mold 80 being mounted to a plate 114 of the assembly 82, such as by screws 116. The outer member 110 is formed of a porous metal, such as a 2 micron stainless steel. The inner support member 112 is provided with a passageway 118 for the passage of an intermediate heat transfer liquid by conduits 120 and 122. The inner support member 112 may be helically-shaped and formed of a material exhibiting excellent heat transfer properties, such as copper, and is shaped to provide support for the outer member 110 as well as to provide for fluid communication therethrough.

In order to thermoform hollow articles having a large length to diameter ratio, e.g. greater than 4:1 with excellent biaxial orientation, it is necessary to provide a shoulder on the male mold, such as at 120 to prevent the thermoplastic material from collecting in a plurality of longitudinally-extending creases when drawing the material about the pin thereby to ensure uniform thickness.

While the invention has been described in connection with an exemplary embodiment thereof, it will be understood that many modifications will be apparent to those of ordinary skill in the art and that this application is intended to cover any adaptations or variations thereof. Therefore, it is manifestly intended that this invention be only limited by the claims and the equivalents thereof.

I claim:

1. A novel apparatus for thermoforming a hollow plastic article from a sheet of thermoplastic material which comprises:

a thermoforming machine;

lower and upper support members fixedly mounted to said thermoforming machine;

means for linearly moving said sheet of thermoplastic material between said support members;

a male mold assembly mounted on one of said support members; said male mold assembly including an extendible clamping means for engaging a selected portion of said sheet and a male mold means for assisting in the formation of said article;

a female mold assembly mounted to said other support member, said female mold assembly including an extendible clamping means for engaging said selected portion of said sheet with said clamping means of said male mold means and a female member means having a chamber, said male mold assembly and said female mold assembly being fixedly positioned relative to each other at a distance greater than the length of said hollow article to be formed;

means for extending said clamping means to trap said selected portion of said sheet therebetween;

fluid cylinder means for extending and withdrawing said male mold means through a plane of said sheet of thermoplastic means;

fluid cylinder means for extending and withdrawing said female member means to cooperate with said male mold means to form said hollow plastic article; and means for removing said hollow plastic article.

2. The apparatus as defined in claim 1 wherein said fluid cylinder means are motivated by a compressed gaseous media.

3. The apparatus as defined in claim 1 wherein said male mold assembly and said female mold assembly are mounted to platens which are adjustable relative to each other.

4. The apparatus as defined in claim 1 wherein said male mold means is formed with an outer surface contoured to the shape of said hollow plastic article.

5. The apparatus as defined in claim 4 wherein said female mold member means includes conduit means for introducing a compressed gaseous media into said chamber of said female mold means.

6. The apparatus as defined in claim 1 wherein said chamber of said female mold means is formed with an inner surface generally contoured to the shape of said hollow plastic article.

7. The apparatus as defined in claim 6 wherein said male mold assembly includes conduit means in fluid communication with the compression side of a compressor means to assist in forming said thermoplastic material.

* * * * *